United States Patent [19]

Numakura et al.

[11] Patent Number: 5,134,494

[45] Date of Patent: Jul. 28, 1992

[54] METHOD FOR PRODUCING COLOR AND BLACK PLATES IN A MULTI-COLOR PLATE MAKING APPARATUS

[75] Inventors: Takashi Numakura; Iwao Numakura, both of Tokyo, Japan

[73] Assignee: Yamatoya & Co., Ltd., Tokyo, Japan

[21] Appl. No.: 704,972

[22] Filed: May 23, 1991

[30] Foreign Application Priority Data

Feb. 4, 1991 [JP] Japan ................................. 3-78668

[51] Int. Cl.$^5$ .......................... H04N 1/23; H04N 1/46
[52] U.S. Cl. ........................................ 358/298; 358/80
[58] Field of Search .................... 358/298, 80, 75, 455, 358/456, 458; 101/463.1, 469

[56] References Cited

U.S. PATENT DOCUMENTS

| | | | |
|---|---|---|---|
| 4,811,108 | 3/1989 | Numakura | 358/298 |
| 4,833,546 | 5/1989 | Numakura | 358/298 |
| 4,924,323 | 5/1990 | Numakura | 358/298 |
| 4,956,718 | 9/1990 | Numakura | 358/298 |
| 5,057,931 | 10/1991 | Numakura | 358/298 |

Primary Examiner—Benjamin R. Fuller
Assistant Examiner—Scott A. Rogers
Attorney, Agent, or Firm—Wenderoth, Lind & Ponack

[57] ABSTRACT

Light intensity values as picture information of a color original are obtained by using photographic density characteristic curves of the color-film original, instead of conventional density values. Thus obtained light intensity values are processed by conducting a specific tonal conversion formula (1) to obtain color-separation curves for color (C, M and Y) plates. On the basis of the color-separation curves for the color plates, a range to be entered black is determined, and a color-separation curve for a black (B) plate is set by conducting the same tonal conversion formula (1).

5 Claims, 5 Drawing Sheets

FIG. 1

Logarithmic Value of Light Exposure (Lux·Second)

METHOD FOR PRODUCING COLOR AND BLACK PLATES IN A MULTI-COLOR PLATE MAKING APPARATUS

BACKGROUND OF THE INVENTION

1. Field of the Invention

The present invention relates to a method for rationally setting a black plate (hereinafter referred as "B plate") used in combination with cyan, magenta and yellow plates (hereinafter called as "C, M and Y plates") in a multicolor plate-making apparatus.

More specifically, the present invention relates to a novel method for not only determining a color-separation curve for a C plate or any other basic color plate, but also rationally setting a color-separation curve for a black (B) plate in association with the basic color plate, by using a specific tonal conversion formula.

2. Description of the Related Art

The importance of a black plate has been widely recognized in the field of multicolor plate-making. For example, the black plate is recognized as an important plate for finally adjusting a gradation and color-tone of a color printed picture.

As is well known, color separation work consists of to converting picture information values (density information values or physical values correlating thereto) of a color-film original picture in continuous gradation into a printed picture in half-tone gradation and a color-correction work. Particularly in recent years, more attention is paid to the importance of a tonal conversion technique from a viewpoint of faithful reproduction and color reproduction of an original picture. This is a natural result since when a delicate and fine tone (gradation) belonging to a color-film original picture is once lost in the course of production of a printed picture, the tone which has been lost cannot be reproduced even if compensated with a color-correction technique. In this field, however, color-correctionism where the color correction is regarded as the most important matter has been dominant for a long time, even now in the technique for production of printed pictures, therefore color-scanners as tools for color-separation work are, of course, affected with this thought.

Meanwhile, the tonal conversion work is carried out on the basis of a color-separation curve. This color-separation curve is a curve, referred also as "a tone reproduction curve", which is expressed in an orthogonal coordinate system of which a horizontal axis represents density values of an original picture and a vertical axis represents dot area % values. This curve is extremely important in defining tonal conversion (conversion of continuous tone into halftone).

A multicolor plate-making work is carried out on the basis of color-separation curves defined for three color plates (C, M and Y) and black (B) plate, respectively. Out of these plates, the black (B) plate is utilized in the multicolor plate making work in such a manner that:

(1) in three-color plate-making using three color plates (C, M and Y) therein, black color is not yielded because of impurities of the printing inks, namely, spectral reflectance curves of the respective colors largely deviate from ideal ones. To compensate for this, the black plate is adopted;

(2) the black plates is used in association with a technique of under color removal (UCR) in a scanner work.

The black plate is used in relation with the under color removal (UCR) for adjustment of a shadow balance (fog or density in the shadow area), maintenance of a gray balance in the middle area or the whole area, appropriate printing (speed up of printing, adjustment of time required to dry the inks), or reduction of the ink cost by reducing a part of the color plates (C, M and Y) (UCR).

Meanwhile, it is common in this field that modes of use of the black plate are classified according to a density value from which black is started to be used for each of the plates [this being called as "starting point (STP)"] or an amount of black to be used (UCR amount). The former STP and is set in a short range (e.g., 1.0 density) is referred as "skelton black", while what the highlight point of a black plate and is started from an area of low density, similar to color plates, is referred as "full black", such black plate being used as a main plate in achromatic plate-making. The latter full black is called as "gray component replacement (GCR)", or termed in Europe as "achromatic color reproduction".

A color-separation curve of the black plate is suitably altered by the scanner operator or the like, from the viewpoint described above, and further from a viewpoint of which tone, soft like or hard like, is provided to a resulting print, etc.

A problem in setting color-separation curves lies in the following point. Conventional color-separation curves for the respective color plates (C, M and Y) are set on the basis of experiences and intuition of the operator, or are set on the basis of experiences of the scanner manufacturer and stored in a memory of the scanner.

On the other hand, reflecting the above circumstances of the color-separation curves for the color plates (C, M and Y), a color-separation curve for the black plate (B) is also quite experiential, thus unsatisfactory when seen from a viewpoint of the thought that the color-separation curves of both color plates and black plate should be rationally set.

The way of thought about rational setting of color-separation curves of color and black plates is that a gradation of pixels ranging from the highlight area (H) to the shadow area (S) of an original picture is reproduced with fidelity of 1:1, in other words, picture information values of the original picture is tonal-converted so as to obtain a natural gradation when observed by human vision. The color-separation curves of the plates should be set on the basis of this thought, taking into consideration organic relationships among the plates.

However, there is a difficult factor obstructing a rational approach in setting of a color-separation curve of a black (B) plate. The factor is a constitution of a halftone dot (dot) arrangement, when seeing it microscopically.

This point will be described hereinafter in detail in the case of setting a color-separation curve for a black (B) plate under UCR or GCR.

In order to rationally set color-separation curves, a color-separation curve for black (B) plate has required to be set on the basis of gray and/or black component(s) which is/are produced by accumulation of three color printing inks, besides color-separation curves for the respective color plates of C, M and Y have to be set after under color removal. In this case, how the gray and/or black component is formed throughout a range from the H to S area of a color printed picture by accumulation of the three printing inks of C, M and Y has not been substantiated by a rational theory which can give an explanation totally to the whole areas. Relating to this point, difficulties existing in build-up of the theory would be easily understood because micro-structures of halftone dots respectively set to pixels on a printed picture, namely sizes of dots set to the H, middle and S areas, and their constitutional arrangements differ from each other. This point should be, however, overcome anyhow for the purpose of improvement of the printing techniques.

The present invention is to approach a rational setting of a color-separation curve for a black (B) plate, on the basis of color-separation curves for color plates (C, M and Y) (C becoming a basic plate in common practise), as will be described later.

The present inventors have honestly studied in order to make the technique for setting color-separation curves (tonal conversion curves, tone reproduction curves) rational, which technique forms a crux of the color-separation work. In the course of the investigation, the present inventors found that it is possible to produce a printed picture having excellent tonal characteristics from any type of original picture, regardless of its picture quality (for example, an original which is extremely difficult to be reproduced, such as under- or over-exposed, high- or low-key, variously color-fogged, etc.) in the following manner. That is, instead of the conventional technique for setting a color-separation curve for, for example, cyan (C) plate defined on the basis of a relationship between density information values obtained via a red (R) filter, which is in a relationship of a complementary color with cyan (C) and is used for producing the C plate, and dot area % values, adopted in the present invention are photographic characteristic curves of a color-film photographic material, on which an original picture has been photographed, to convert the density information values into light exposure values. And then these obtained light exposure values are then converted by conducting a specific tonal conversion formula to determine dot area % values, or to set a color-separation curve defined on the basis of a relationship between light intensity values and dot area % values, so that a printed picture having a superior quality may be produced (Japanese Patent Application Nos. 1-135825 and 1-212118)

Incidentally, it should be noted that, in the present invention, the meaning of the term of "light exposure value" is included in a conception of light intensity value, as will be described later, hence hereinafter will be referred as "light intensity value".

Conventional color-separation curves for the color plates, which are defined on the basis of the relationship between density information values and dot area % values, will be hereinafter referred as "D axis color separation curves" since picture information values obtained from a density axis of a characteristic curve of a photographic material. To the contrary, color-separation curves for the color plates, defined on the basis of light intensity values, which values become an object in the present invention, and the dot area % values will be hereinafter referred as "X axis color-separation curves" since the picture information values obtained from a light intensity axis or the horizontal axis (X axis) of the characteristic curve of the photographic material. It should be noted that the latter X axis color-separation curve is clearly distinguished from the former D axis color-separation curve in this invention.

SUMMARY OF THE INVENTION

By adopting X axis color-separation curves, it became possible to produce a printed picture having a gradation ranging from the H to S area, quite natural to human vision, in other words, a picture having a linear density, and a superior color-tone as well. As a next step of the inventor's investigation, they tried to incorporate a technique for setting a color-separation curve for a black (B) plate into the above technique for setting color-separation curves for the color plates.

As a result, it has been found that a printed picture having a satisfactory picture quality can be produced in the following manners. At first, an X axis color-separation curve for a certain color plate, for example C plate becoming a basis for setting a black (B) plate, is set utilizing the setting technique of X axis color-separation curves for the color plates (C, M and Y), wherein a stress is put on light intensity values. And then, an X axis color-separation curve for the black (B) plate is defined in association with the X axis color-separation curve for the C plate, wherein a stress is put on the light intensity values similarly, so as to conduct a multicolor process.

The present invention provides a novel technique for setting a color-separation curve for a black (B) plate, which technique is able to be used to any plate-making method, wherein an importance is put on light quantity values in the course of setting of a color-separation curve for the black (B) plate, and quite different from the conventional technique as previously described.

It is an object of this invention to provide a method for rationally setting a color-separation curve for a black (B) plate in association with another color-separation curves for color (C, M and Y) plates (tonal conversion curves defining a relationship between picture information of an arbitrary pixel of an original picture and a dot area % value thereof).

There is thus provided a method for setting a color-separation curve for a black plate for use in multicolor plate-making, the method comprising the steps of:

(i) determining a light intensity value ($X_n$) and further a basic light intensity value ($x_n$) from a density information value ($D_n$) of an arbitrary pixel of an original picture by using photographic density characteristic curves of a photographic film used to form the color-film original, and converting the basic light intensity value ($x_n$) into a dot area % value ($a_{xn}$) by conducting a tonal conversion formula (1), thereby setting a color-separation curve of a predetermined color plate becoming a basis (any one among C, M or Y) other than a black (B) plate, the color-separation curve of the basic color plate being represented by a correlation between the basic light intensity values and the dot area % values;

(ii) determining a light intensity value range ($X_{BXH}$-$X_{BXS}$) to be set the black plate thereto and dot area % values ($a_{BH}$-$a_{BS}$) to be set thereto on the color-separation curve of the basic color plate;

(iii) converting a basic light intensity value ($B_{xn}$) of the arbitrary pixel in the light intensity value range ($X_{BSH}$-$X_{BXS}$) into a dot area % value ($a_{Bxn}$) for the black plate, thereby setting a color-separation curve of the black plate under the initial conditions (ii) for setting the black plate by conducting the tonal conversion formula (1):

$$a_{xn} = a_H + a(1 - 10^{-k \cdot x_n})(a_s - a_H)/(a - \beta) \qquad (1)$$

where $x_n$: a basic light intensity value represented by $x_n=[X_n-X_{Hn}]$, determined by substracting a light intensity value ($X_{Hn}$) of the brightest area obtained from a corresponding density information value ($D_{Hn}$) of the brightest area of the original picture from a light intensity value ($X_n$) of a pixel obtained from a density information value ($D_n$) of a corresponding pixel of the original picture for a basic color plate, where the brightest area of the black plate should be read as a part where black is entered (a black starting point);

$a_{Xn}$: a dot area % value set to a pixel on color (C, M and Y) and black (B) plates corresponding to an arbitrary pixel of an original picture;

$a_H$: a dot area % value predeterminedly set to a black starting point of a black plate or the brightest area of respective color plates;

$a_S$: a dot area % value predeterminedly set to a part of a black plate where entering of black is finished or the darkest area of respective color plates;

$\alpha$: a surface reflectance of a paper used to produce a printed picture thereon;

$\beta$: a value determined by $\beta=10^{-\beta}$;

k: a value determined by $k=\gamma/(X_{Sn}-X_{Hn})$, where $X_{Sn}$ is a light intensity value of the darkest area obtained from a density information value ($D_S$) of the darkest area (S area) of an original picture for a basic color plate, but it represents a light intensity value of a black finishing point in the case of a black plate;

$\gamma$: an arbitrary coefficient; and xn, n, Hn, Sn, H and S should be accompanied with C, M Y and B in relation to color (C, M and Y) and black (B) plates upon conducting the tonal conversion formula (1).

The present invention provides a method for setting a color-separation curve for a black (B) plate and has following advantages.

(i) It is not too much to say that color-separation curves for not only color (C, M and Y) plates but also black (B) plate have been produced by experiences and intuition of the scanner manufacturer or operator. The reason for this is that there has not been developed any theory or methodology about how to set appropriate dot area % values to respective minute pixels (halftone dots) ranging from the H to the S area of an original picture in order to produce a printed picture having a tone feeling natural to human vision. To the contrary, a method provided by the present invention is quite rational since, in order to uniformly process color-film originals having various picture qualities, color-separation curves for color (C, M and Y) plates are set by using a specific tonal conversion formula together with light intensity values as picture information of the original picture and a color-separation curve for a black (B) plate in association with these.

(ii) X axis color-separation curves which represent a correlation between light intensity values (regularized light intensity values, particularly) and dot area % values obtained by the tonal conversion formula of this invention show gradations of color and black (C, M, Y and B) plates ranging from the H to the S area of a color printed picture, or a final product. Consequently, observation of shapes of the curves make it possible to evaluate in advance a picture quality of the final color printed picture. Whereby it is further possible to directly produce machine plates from the color-film orignal. This will become a pioneering technique in direct plate-making in multicolor plate-making incorporated a black plate therein.

(iii) Rational production of a desired black plate makes it possible to produce a color printed picture which meets customer's demands, along with taking advantages of the black plate.

(iv) It is possible to enjoy merits of a black plate, such as tonal adjustment of a shadow area, maintenance of a gray balance, reduction of an amount of printing inks, speed-up of printing, reduction of consumed energy to dry inks after printing, etc.

(v) In connection with (i), a rational theory was established in tonal conversion including setting of a black (B) plate (also including setting of the color-separation curve, of course), which is a crux of color-separation work, thereby becoming possible a rational education of color-separation technique, which has been said to be difficult.

BRIEF DESCRIPTION OF THE DRAWINGS

The object and features of the present invention may be understood with reference to the following description of the invention, taken together with the accompanying drawings in which.

DETAILED DESCRIPTION OF THE INVENTION

Hereinafter, the technical construction of the present invention will be described in detail.

According to the present invention, basic color-separations curves (X axis) for respective color plates (C, M and Y) should be obtained by using the aforedescribed tonal conversion formula (1) in order to set a color-separation curve for a black (B) plate. There is taken a standpoint in the present invention that the color-separation curve for the black (B) plate is intended to be set on the basis of an organic relationship between the color-separation curve for the black (B) plate and the color-separation curves for the other color plates, in other words, intended to be set by using the same tonal conversion formula (1).

This point absolutely differs from the conventional technique because a conventional color-separation curve for a black (B) plate is set on the basis of experiences and intuition of the operator or the like. In the conventional technique, no attention is paid to a microscopic point of view which appropriate size of a dot should be set to each pixel in an entire black range.

Hereinafter will be described a method for setting an X axis color-separation curve, for example, for a C plate which is designated as a basis for setting a black (B) plate.

Of course, that any other color plate (M or Y) may become the basis for setting the black (B) plate.

As previously described, in a method according to the present invention, an X axis color-separation curve for the C plate, which becomes a basis for setting a black (B) plate, is not obtained by directly converting density information values obtained from a color-film original through a red (R) filter, which is in a complementary-color relationship with the color C. In order to produce a printed picture having a superior picture quality from any kind of original, for example, over-, normal- or under-exposed, high- or low-key, variously color-fogged, or faded, without being affected by a quality of the original picture (any type can be the original, for example, positive, negative, transparent or reflection) to be an object for the plate-making, the present invention uses light intensity values, not density information values, as picture information for the tonal conversion. This is an outstanding feature of this invention, different from the conventional technique.

According to the present invention, the light intensity values may be readily determined from photographic density by utilizing characteristic curves or photographic characteristic curves of a color-film photograhic material (photosensitive emulsion), on which an original picture has been shot.

Hereinafter will be described a reason why, according to the present invention light intensity values of an original picture are used upon conducting a tonal conversion (conversion of continuous tone into halftone) instead of density information values. To the reasoning is based on the concept of the present inventors that, in order to rationally carry out tonal conversion of originals having various types of picture quality, if density information values which are dependent on the photographic characteristic curves inherent in a color-film photographic material are not used, but instead light intensity values of a subject (literally being the basis of the original picture itself, referred also as "substantial picture" or "real scene") are used, since the light intensity values are picture information independent from the photographic density characteristic curves, any original picture might be tonal-converted, rationally and systematically.

The method for setting an X axis color-separation curve for a C plate will be hereinafter described in detail, referring to tables and figures attached hereto.

(i) (1) First, it is necessary in the present invention to express photographic density characteristic curves of a color-film photographic material, on which an original picture has been taken, in functional equations. Whereby, from a density information value ($D_n$) of an arbitrary pixel (n point) on an original picture, a light intensity value ($X_n$) of a corresponding pixel may be determined. It is sufficient for the formulation to use photographic density characteristic curves presented as technical data by the photographic material manufacturer of the film.

Figure 1:
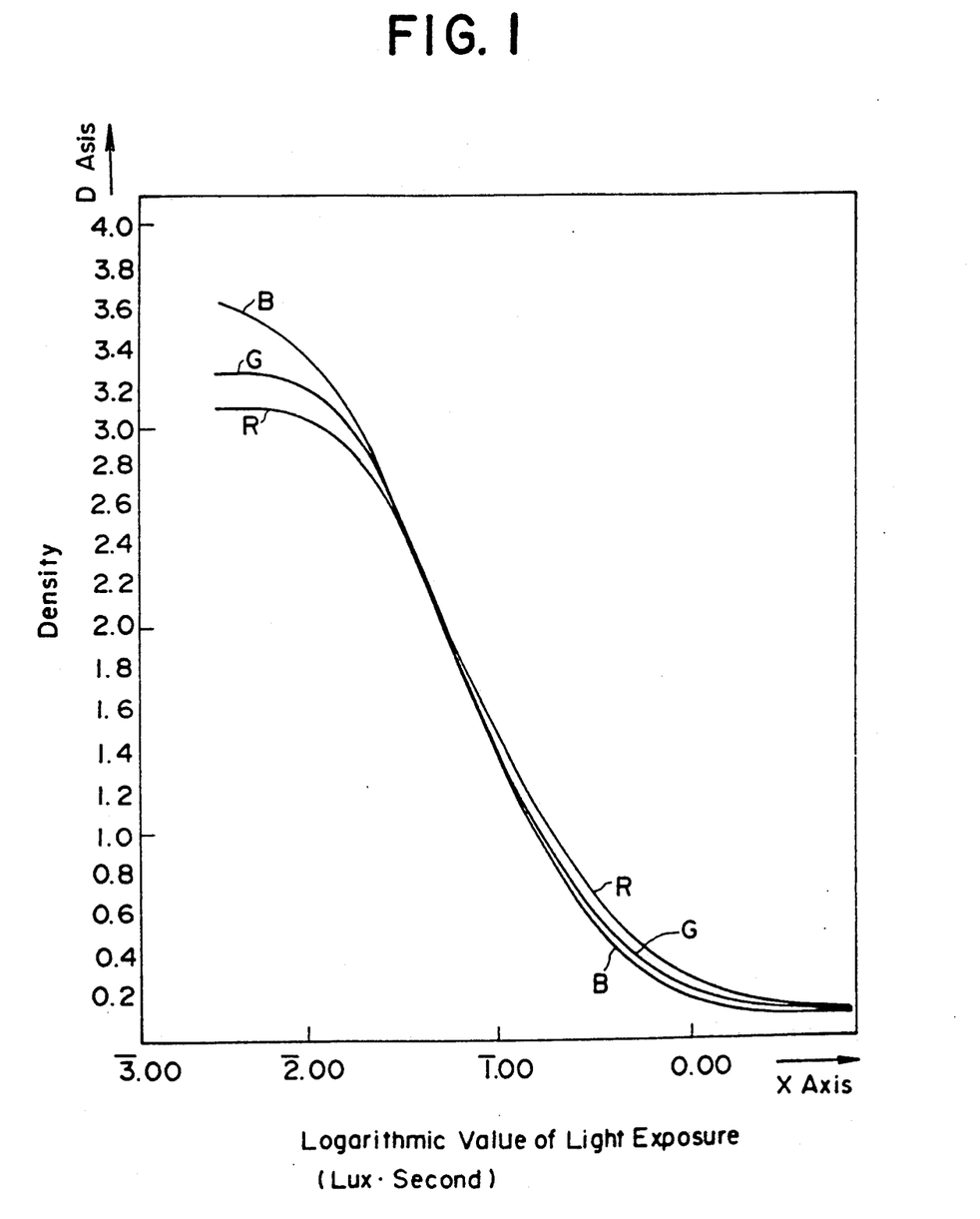
FIG. 1 shows photographic density characteristic curves of a color-film.

As an example, FIG. 1 shows photographic density characteristic curves of Ektachrome 64, professional film (day light) manufactured by Eastman Kodak.

Next, a method of the formulation of the photographic density characteristic curves shown in FIG. 1 will be described.

Any manner may be adopted when formulating the photographic density characteristic curves, there being no limitation thereupon.

For instance, if the vertical axis=D=log Io/I, the horizontal axis=X (provided that a scale of the X axis is coincided with that of the D axis), and a, b, c, d, e and f are constants, the formulation may be carried out in the following manner:

(a) toe portion (a portion in a recessed shape, where the D values are small) of the photographic characteristic curve:

$$D = a \cdot b^{c \cdot (X+d) + e} + f$$

(b) appropriately linear portion (a portion in an appropriately linear shape, where the D values are medium):

$$D = a \cdot X + b, \text{ or}$$

$$D = a \cdot X^2 + bX + C;$$

(c) shoulder portion (a portion in an convex shape, where the D values are large):

$$D = a \cdot \log\{b + (X+c)\} + d$$

Alternately, the formulation may be also carried out in such a manner that the toe, shoulder and approximately linear portion are divided into small sections and formulated so as to make each of the sections approximately linear. It is preferable to divide these areas as small as possible and make them approximately linear as much as possible when conducting the formulation, in order to well reproduce a gradation in the toe and shoulder portions.

Since a color-film photographic material has its own characteristic curves each corresponding to respective R, G and B photosensitive emulsions as shown in FIG. 1, it is preferable to use them so as to correspond them to the respective color plates. As a convenient method, it is possible to adopt a characteristic curve of any one of the emulsion layers.

Table 1 shows results of the formulation. Incidentally, in order to formulate the photographic density characteristic curves as accurately as possible, there are adopted a plurality of sections for the formulation in Table 1.

TABLE 1

List of Formulae of a Photographic Characteristics Curve
Formulae for converting color-original density (D) into values (X) on the X axis

| Emulsion layer | No. | D | X |
|---|---|---|---|
| R | 1 | 0.1444–0.8000 | $X = \log\{(D - 0.756 + 0.05158\}$ |
|  | 2 | 0.8000–1.0000 | $X = 1.1475 + 0.7000(D - 0.8000)$ |
|  | 3 | 1.0000–1.2000 | $X = 1.2873 + 0.6000(D - 1.0000)$ |
|  | 4 | 1.2000–1.4000 | $X = 1.4075 + 0.3250(D - 1.2000)$ |
|  | 5 | 1.4000–2.2000 | $X = 1.5125 + 0.3000(D - 1.4000)$ |
|  | 6 | 2.2000–2.8000 | $X = 1.9125 + 0.5125(D - 2.2000)$ |
|  | 7 | 2.6000–2.8000 | $X = 2.1175 + 0.7125(D - 2.6000)$ |
|  | 8 | 2.8000–3.175 | $X = 1.15 + e^{\frac{1}{100} \cdot 10(D - 2.2638) \div 0.4455}$ |
| G | 1 | 0.1444–0.8000 | $X = \log\{D - 0.0841\} \div 0.04517$ |

TABLE 1-continued

List of Formulae of a Photographic Characteristics Curve
Formulae for converting color-original density (D) into values (X) on the X axis

| Emulsion layer | No. | D | X |
|---|---|---|---|
| | 2 | 0.8000–1.0000 | $X = 1.2000 + 0.7500(D - 0.8000)$ |
| | 3 | 1.0000–1.4000 | $X = 1.3500 + 0.5825(D - 1.0000)$ |
| | 4 | 1.4000–1.8000 | $X = 1.5750 + 0.50825(D - 1.4000)$ |
| | 5 | 1.8000–2.6000 | $X = 1.7775 + 0.4250(D - 1.8000)$ |
| | 6 | 2.5000–2.8000 | $X = 2.1175 + 0.4125(D - 2.6000)$ |
| | 7 | 2.8000–3.0000 | $X = 2.2000 + 0.8375(D - 2.8000)$ |
| | 8 | 3.000–3.2178 | $X = 1.2275 + e^{\frac{1}{100} \cdot 10(D-2.7035)+0.3028}$ |
| B | 1 | 0.1333–0.8000 | $X = \log\{(D - 0.0758) \div 0.4314\}$ |
| | 2 | 0.8000–1.0000 | $X = 1.2250 + 0.625(D - 0.8000)$ |
| | 3 | 1.0000–1.4000 | $X = 1.3500 + 0.5625(D - 1.0000)$ |
| | 4 | 1.4000–1.8000 | $X = 1.5750 + 0.30825(D - 1.4000)$ |
| | 5 | 1.8000–2.6000 | $X = 1.7775 + 0.4250(D - 1.8000)$ |
| | 6 | 2.6000–2.8000 | $X = 2.1175 + 0.4125(D - 2.6000)$ |
| | 7 | 2.8000–3.0000 | $X = 2.2000 + 0.3250(D - 2.8000)$ |
| | 8 | 3.0000–3.2000 | $X = 2.3050 + 0.5375(D - 3.0000)$ |
| | 9 | 3.2000–3.4000 | $X = 2.4125 + 0.5765(D - 3.2000)$ |
| | 10 | 3.4000–3.6000 | $X = 2.3278 + 1.7380(D - 3.4000)$ |

In formulation of the photographic density characteristic curves shown in FIG. 1, the D axis representing density values of a color-film original and the X axis representing light intensity values shown by log E of a camera subject (substantial picture) were assumed to have a same scale upon formulating the D and X.

This scaling relating to the D and X axis was adopted from the following point of view, the present inventors assuming that this treatment was quite rational.

Logarithmic values of light exposure (E) (log E = log I x t) are placed on the X axis of a photographic density characteristic curve. These logarithmic values are logarithmically evaluated by human vision having logarithmic discrimination characteristics to brightness. On the other hand, the D axis, represents logarithmical physical quantity, which is also logarithmically evaluated by human vision. Accordingly, if the D and X values are correlated with each other on the same scaling, no irrationality would occur.

Incidentally, the above scaling is considered convenient but, as a matter of course that there is no limitation thereto. For example, it is possible to formulate the photographic density characteristic curve by adopting a relationship between numeral values of the D and X axis shown in FIG. 1. In this relative meaning, a term "light intensity value" is used in the present invention, which means a conception including light exposure value as physical quantity of the X axis.

(i) (2) The present invention is based on picture information values given from a subject (substantial picture, real scene), namely, light intensity values ($X_n$ values) represented by the X axis, not density information values ($D_n$ values) of a color-film original, as mentioned before.

The $X_n$ values may be readily determined from the $D_n$ values since the $D_n$ and $X_n$ values are correlated by the functional formulae, $X = f(D)$, of the photographic density characteristic curve, as shown in Table 1.

(i) (3) In the above manner, the light intensity values ($X_n$) given from the subject (substantial picture) may be obtained. Next, color-separation curves, namely X axis color-separation curves, of which light intensity values are put a stress thereon, are only necessary to be obtained instead of conventional D axis color-separation curves, of which the density information values are put a stress thereon, by using the $X_n$ values which have been rationally determined and the tonal conversion formula (1). That is, a light intensity value ($X_n$) of an arbitrary pixel on a subject (substantial picture) is determined from a density value ($D_n$) of a corresponding pixel (n point) on a color-film original by using a given photographic density characteristic curve, the $X_n$ value is substituted in the tonal conversion formula (1) to determine a dot area % value which is a tonal intensity value, whereby an X axis color-separation curve is set. Upon conducting the tonal conversion formula (1), it is necessary to convert the light intensity value ($X_n$) into a basic light intensity value ($X_n$). As will be described later, this treatment is required to obtain a dot area % value which should be set beforehand to the H and S areas. In order to produce a C plate, it is only necessary to operate a dot generator of a color-scanner according to the X axis color-separation curve for the C plate.

Now, a process of derivation of the tonal conversion formula (1) of the present invention will be described in brief.

In production of a printed picture in halftone, the tonal conversion formula (1) for determining a value ($a_{Xn}$) of dot area % set to each pixel of an original picture is derived from a general density formula (photographic density, optical density), that is:

$$D = \log I_o/I = \log 1/T$$

where
Io = an incident light intensity;
I = a reflected or transmitted light intensity; and
T = I/Io = a reflectance or transmittance.

When the general formula relating to density D is applied to plate-making or printing, the following formula is given:

Density ($D'$) in plate-making or printing
= log Io/I
= log (unit area × reflectance of paper)/[(unit area − dot area) × reflectance of paper + dot area × surface reflectance of ink)]
= $\log \dfrac{\alpha A}{\alpha\{A - (d1 + d2 + \ldots dn)\} + \beta(d1 + d2 + \ldots dn)}$ where
A: unit area
dn: an area of each dot in a unit area;

$\alpha$: a reflectance of printing paper; and
$\beta$: a surface reflectance of printing ink.

The tonal conversion formula (1) was derived on the basis of the density formula (D') relating to plate-making and printing by adopting a light intensity value, not a density value, as picture information so as to coincide a theoretical value with a measured value in relationship between a basic light intensity value ($x_n$) of a sample point (pixel) (n point) on an original picture in continuous tone and a dot area % value of a dot of a corresponding sample point on a printed picture in halftone.

Parameters of $a_H$ and $a_S$ in the tonal conversion formula (1) are treated as constants when the tonal conversion formula (1) is conducted, for instance, dot area % such as 5% to $a_{CH}$ and 95% to $a_{CS}$ of a C plate, 3% to $a_{MH} = a_{YH}$ and 90% to $a_{MS} = S_{YS}$ of Y and M plates, or the like. In conduction of the tonal conversion formula (1), if an Xn value which is determined in association with a Dn value measured by a densitometer besides a % value is used to $a_H$ and $a_S$, an $a_{xn}$ will be calculated as a % value.

Another important parameter, the $\gamma$ value, in the tonal conversion formula (1), is considered to be generally treated as a constant when setting a color-separation curve for a C plate by conducting the tonal conversion formula (1). The $\gamma$ value may be fixed to 0.45 when setting an X axis color-separation curve for the C plate. The above treatment was derived by the present inventors in circumstances of the development of a prior tonal conversion formula, where density values are employed as picture information values, during the course of development of the tonal conversion formula (1) of this invention. A solid density value for a yellow ink, $\gamma = 0.9$–$1.0$, was employed as the $\gamma$ value in the prior tonal conversion formula, which has a construction similar to the tonal conversion formula (1) of this invention. The reason for employment of the solid density value to the yellow ink is that the yellow ink has the largest stimulus value to human vision among the printing inks. Whereby a D axis color-separation curve having a good coordination with the practice of the color-separation work could be set. When the density information values were converted into light intensity values as the picture information values according to the present invention, it was proved in a number of experiments that the $\gamma$ value can be set to 0.45, which is approximately a half of the above $\gamma$ value. The reason of setting of the $\gamma$ value to 0.45 can be explained from the shape of the photographic density characteristic curve. It is very important in the present invention to recognize that the $\gamma$ value can be suitably altered like this. The $\gamma$ value is an important parameter because the shape of a color-separation curve can be suitably altered by the $\gamma$ value, in other words, a printed picture having desired gradational characteristics can be produced by suitably operating the $\gamma$ value, as will be described later. Therefore, it should be noted that the $\gamma$ value is not necessarily fixed to the above value.

The setting of a numeral value to the parameter in the tonal conversion formula (1) differs according to a standpoint where a tone of a given subject (substantial picture) is intended to be faithfully reproduced on a printed picture, or where a printed picture having a tone which has been intentionally altered (modified or altered) is intended to be produced. In the latter case, the shape of an X axis color-separation curve may be desirably altered by intentionally changing the $\gamma$ value, thereby making it possible to obtain printed pictures having various tones. When intending to make the X axis color-separation curve have a convex shape (to emphasize a tone ranging from the H area to the middle area), it is only necessary to set a value larger than 0 to the $\gamma$ value, when intending an approximately linear shape, a value closer to 0, and when intending, inversely, a recessed shape, a minus value.

Upon conducting the tonal conversion formula (1) according to the present invention, a modified formula may be used such as:

$$a_{Xn} = a_H + E(1 - 10^{-k \cdot X_n}) \cdot (a_S - a_H) \qquad (2)$$

where $$E = 1/(1-\beta) = 1/(1-10^{-\gamma})$$

It is also sufficient to use a formula arbitrary processed, modified, derived, etc.

In the above example, $\alpha = 1$. This means that a surface reflectance of a printing paper used for expressing a printed picture thereon takes 100%. The $\alpha$ may be set to 1.0 because the zero position is adjusted to the brightness of the paper in practice, although the $\alpha$ value may take an arbitrary value.

Incidentally, it is an advantage of the present invention that, in the above example ($\alpha = 1.0$), $a_H$ and $a_S$ can be set to the brightest area H and the darkest area S respectively, as intended. This is previous from $x_n = 0$ in the brightest area H on a printed picture and $x_n = X_{Sn} - X_{Hn}$ in the darkest area S according to the definition, namely:

$$-k \cdot x_n = -\gamma \cdot (X_{Sn} - X_{Hn})/(X_{Sn} - X_{Hn}) = -\gamma$$

It is very important that $a_H$ and $a_S$ can be set on a printed picture as intended when the user considers a result of his work. For example, color-separation curves of various types may be obtained by setting desired values to $a_H$ and $a_S$ on the printed picture and changing the $\gamma$ value (but $\alpha = 1.0$). And, the printed picture produced on the basis of these color-separation curves may be easily evaluated in relation to the $\gamma$ value.

An important point in the plate-making practice is that X axis color-separation curves obtained according to the present invention represent gradation characteristics and a tone ranging from the H to S of a printed picture, a final product, unlike conventional D axis color-separation curves. Whereby, the plate-making worker can make an accurate estimation of a result (tone) of a final printed picture by observing shapes of the X axis color-separation curves obtained on the basis of predetermined $a_H$, $a_S$ and $\gamma$ values. The above-mentioned character becomes feasible only by the tonal conversion method according to the present invention where X axis color-separation curves each set to the respective originals having different picture qualities converge into the same X axis color-separation curve, which is one of the advantages of the present invention. To the contrary, conventional D axis color-separation curves (if adopted the same $a_H$, $a_S$ and $\gamma$ values) are different from each other corresponding to respective originals having different picture qualities and their shapes are complicated. Consequently, the plate-making worker cannot accurately estimate a final printed picture only by observing the curves. The above described is very important because the plate-making worker can accurately estimate a result of a final printed picture by representing, e.g., monitor representing, X axis color-separation curves of color and black (C, M, Y and B) plates, thereby being able to omit various proof reading works. In other words, direct plate-making (direct plate-making method) will be possible according to the present invention.

In conduction of the tonal conversion formula (1), it is possible to allow the k value to become the $\gamma$ value, that is, it is possible to regularize a ($X_{Sn}-X_{Hn}$) value to be 1.0. This regularization of a dynamic range from $X_{Hn}$ to $X_{Sn}$ to values from 0 to 1 (=1) permits simple computation of the tonal conversion formula (1). A light intensity value of each pixel in the dynamic range, of course, changes according to this regularization, but no problem will occur in setting of a color-separation curve because its change is relative. Incidentally, it should be noted that regularized values will be used in the following description.

The tonal conversion method of a picture used the tonal conversion formula (1) therein according to the present invention is very useful to faithfully reproduce a gradation and color tone of a subject (substantial picture), namely, to reproduce a tone of a subject in a ratio of 1:1 with work regularity, but is usefulness is not limited to this. The tonal conversion formula (1) of this invention is useful to faithfully reproduce a subject, also useful in a point that picture characteristics of the subject may be rationally altered and modified by suitably selecting $\alpha$ and $\gamma$ values, further $a_H$ and $a_S$ values.

By conducting the tonal conversion formula (1) in multicolor plate-making (four plates, C, M, Y and B, being considered to make up one set), X axis color-separation curves may be set in the follow manner. The tonal conversion formula (1) is derived from a standpoint that the most important plate, C plate, among the four plates should be rationally determined. Accordingly, an X axis color-separation curve for the C plate is set by conducting the tonal conversion formula (1), another X axis color-separation curve for M and Y plate is next determined by multiplying a suitable adjustment value known in the field so as to maintain a gray balance or color balance.

A method for setting an X axis color-separation curve for a black (B) plate is as follows.

(ii) After setting a color-separation curve for the C plate which becomes the basis to set a black (B) plate, conditions for setting a color-separation curve for the black (B) plate are determined.

This is a setting of initial conditions to determine a range where the black plate will be entered and to determine an amount of black component which will be entered.

That is, it should be determined to which light intensity value range ($X_{BXH}-X_{BXS}$) the black plate will be set (XH representing a pixel in a black starting point and XS representing a pixel in a black finishing point), and which dot area % values ($a_{BH}-a_{BS}$) will be set to the black starting and finishing point, respectively. Once such initial conditions for setting the black (B) plate is determined, an X axis color-separation curve for the black (B) plate can be set by conducting the tonal conversion formula (1) as well as the C plate so that a suitable dot area % values may be set to each of the pixels within the range.

For example, if black is entered a range equal to or more than 50% as a dot area % value ($a_{CXn}=50$), a basic light intensity value ($B_{xn}$) of the black starting point is determined as follows:

$$B_{Xn} = -1/\gamma \cdot \log\{1-(a_{CXn}-a_H)(1-10^{-\gamma})/(a_S-a_H)\} \quad (3)$$

where $a_{CXn}$ is an arbitrary value equal to or more than 50. Another parameters are, for example, $\gamma=0.45$, as =95 and $a_H=5$.

According to the above formula (3), when the black finishing point is $a_{CXn}=a_S$, $B_{Xn}$ becomes 1.0. Therefore, the light intensity value range ($X_{BXH}-X_{BXS}$) from the black starting point to the black finishing point is set to $B_{Xn}-1.0$ in relation to the color-separation curve for the C plate.

(iii) The color-separation curve for the black (B) plate may be obtained by setting dot area % values, $a_{BH}$ and $a_{BS}$, (5% and 65%, for example) for the black (B) plate to the black starting and finishing point, respectively, besides conducting the tonal conversion formula (1) together with a predetermined $\gamma$ value. Upon conducting the tonal conversion formula (1), the regularization employed upon obtaining the color-separation curve for the C plate is adopted. Namely, if the dynamic range from the black starting point to the black finishing point $[(X_{BXH}-X_{BXS})=(B_{Xn}-1.0)]$ is regularized, the tonal conversion formula (1) can be readily calculated. The color-separation curve for a black (B) plate obtained in such the manner causes no trouble, as stated in the description about the method for setting a color-separation curve for the C plate.

Hereinafter will be further described the above method for setting the color-separation curve for the black (B) plate, showing more concrete numerical values.

(i) Black (B) plate design data
1. Conditions for setting a color-separation curve for the basic C plate.
   (a) Color film: Kodak Ektachrome 64 manufactured by Eastman Kodak (referring to FIG. 1).
   (b) Formulae for photographic density characteristic curves of the color-film: referring to Table 1.
   (c) Conducting conditions of the tonal conversion formula (1): $a_{CH}=5\%$, $a_{CS}=95\%$ and $\gamma_C$ value =0.45.
2. Conditions for setting a color-separation curve for the black (B) plate.
   (a) A range entered the black plate: a range of dot area % values from 50% to 95% on the color-separation curve for the C plate.
   (b) Dot area % values for the black plate: 5% (black starting point) to 65% (black finishing point).
   (c) Conducting conditions for the tonal conversion formula (1), when setting the color-separation curve for the black (B) plate: $a_{BH}=5\%$, $a_{BS}=65\%$ and $\gamma_B$ value (referring to Table 2).

(ii) A color-separation curve for the black (B) plate
   (a) Setting data (calculated values) of the color-separation curve for the black (B) plate: referring to Table 2.
   (b) The color-separation curve for the black (B) plate: referring to FIG. 2 (which is a diagrammatic representation of Table 2).

In Table 2, $a_{CXn}$ shows dot area % values of predetermined pixels ($x_n$) of the C plate, $C_{Xn}$ shows basic light intensity values of the predetermined pixels ($x_n$) of the C plate and $B_{xn}$ shows basic light intensity values of the predetermined pixels ($x_n$) obtained by regularizing the $C_{xn}$ to 1.0.

TABLE 2

Data for Setting Color-Separation Curves for Black Plates (%)

| | | | | | | | | |
|---|---|---|---|---|---|---|---|---|
| a$_{CXn}$ | | | 50.0000 | 60.0000 | 70.0000 | 80.0000 | 90.0000 | 95.0000 |
| C$_{Xn}$ | | | 0.3759 | 0.4839 | 0.6054 | 0.7445 | 0.9072 | 1.0000 |
| B$_{Xn}$ | | | 0.0000 | 0.1730 | 0.3677 | 0.5906 | 0.8513 | 1.0000 |
| No.* | 1 | $\gamma_B$ 0.4500 | 5.0000 | 20.2612 | 34.4625 | 47.5647 | 59.5023 | 65.0000 |
| | 2 | $\gamma_B$ 0.0100 | 5.0000 | 15.4620 | 27.1865 | 40.5448 | 56.0817 | 65.0000 |
| | 3 | $\gamma_B$ −0.2500 | 5.0000 | 13.0725 | 23.1730 | 36.2153 | 53.7519 | 65.0000 |
| | 4 | $\gamma_B$ −0.5000 | 5.0000 | 11.1155 | 19.6244 | 32.0208 | 51.1928 | 65.0000 |
| | 5 | $\gamma_B$ −0.7500 | 5.0000 | 9.5186 | 16.5112 | 28.0091 | 48.4726 | 65.0000 |
| | 6 | $\gamma_B$ −1.0000 | 5.0000 | 8.2624 | 13.8790 | 24.3055 | 45.6712 | 65.0000 |
| | 7 | $\gamma_B$ −1.2500 | 5.0000 | 7.3071 | 11.7267 | 20.9925 | 42.8642 | 65.0000 |
| | 8 | $\gamma_B$ −1.5000 | 5.0000 | 6.6020 | 10.0175 | 18.1070 | 40.1136 | 65.0000 |

*Test number of black plate

Figure 2:
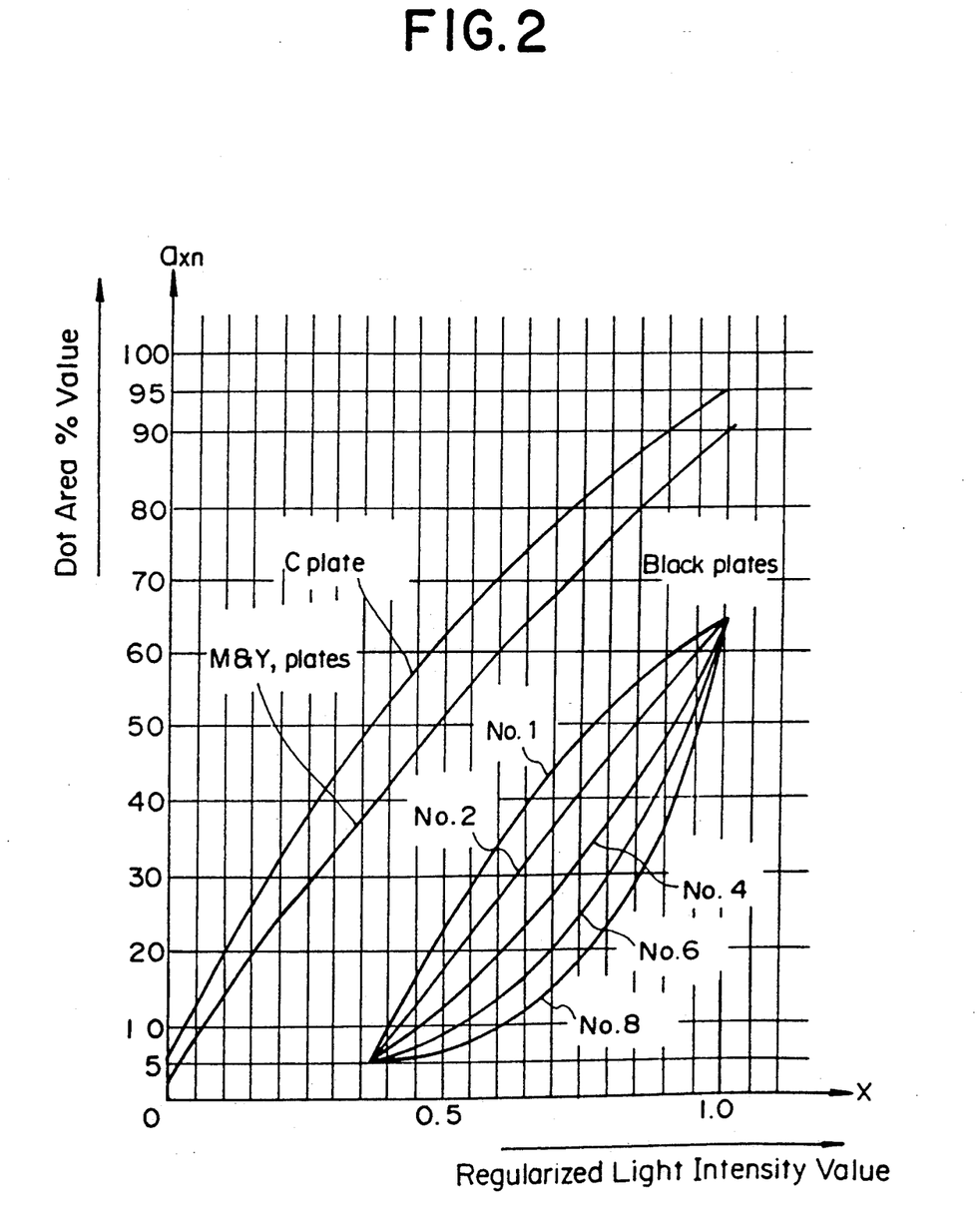
FIG. 2 shows a relationship of X axis color-separation curves between standard color (C, M and Y) plates and various black (B) plates.

Data of the color-separation curve for the C plate in FIG. 2 are shown in Table 3.

In FIG. 2, there are also shown a color-separation curve for M and Y plates, which were set under conditions where their dot area % values differ 10% in the middle area (area of 50% dot in the C plate), 2% in the H area and 5% in the S area from those of the C plate in order to maintain a gray balance.

TABLE 3

Data for Setting a Color-Separation Curve for C Plate

| Step No. | Original density value (D$_n$) | Light intensity value (X$_n$) | Basic intensity value (X$_n$−X$_{Hn}$) | Regularized light intensity Value ($x_n$) | Dot area % value (a$_{Cxn}$) |
|---|---|---|---|---|---|
| 1 | 0.2900 | 0.6187 | 0.0000 | 0.0000 | 5.0000 |
| 2 | 0.4190 | 0.8233 | 0.2046 | 0.1219 | 21.5516 |
| 3 | 0.5480 | 0.9618 | 0.3431 | 0.2045 | 31.6360 |
| 4 | 0.8060 | 1.1517 | 0.5330 | 0.3176 | 44.1160 |
| 5 | 1.0640 | 1.3259 | 0.7072 | 0.4215 | 54.3608 |
| 6 | 1.3220 | 1.4716 | 0.8529 | 0.5083 | 62.1133 |
| 7 | 1.5800 | 1.6025 | 0.9838 | 0.5863 | 68.5096 |
| 8 | 1.8380 | 1.7315 | 1.1128 | 0.6632 | 74.3286 |
| 9 | 2.0960 | 1.8605 | 1.2418 | 0.7400 | 79.6956 |
| 10 | 2.3540 | 1.9914 | 1.3727 | 0.8181 | 84.7327 |
| 11 | 2.6120 | 2.1261 | 1.5074 | 0.8983 | 89.4979 |
| 12 | 2.8700 | 2.2967 | 1.6780 | 1.0000 | 95.0000 |

In the above manner, a color-separation curve for the black (B) plate may be rationally set in relation to a color-separation curve for the basic C plate. The color-separation curve for the black (B) plate is set throughout an area from the black starting point to the black finishing point by conducting the tonal conversion formula (1), however it is possible to apply the tonal conversion formula (1) to a part of the area and apply another formula (linear, secondary curve, etc.) to the remaining areas so as to set a color-separation curve for the black (B) plate.

It has been said in a long history of the development of plate-making and color-separation techniques that the black plate is the most important to finally adjust a gradation and color-tone of a color printed picture. Also in the long history, there has been developed know-hows such as to apply a black plate even to a bright area of a picture of the respective color-plates. (C, M and Y) to make a gradient of a gradation which is gentle in the middle area and steep in the shadow area.

However, the black plate has not been used most advantageously in the conventional technique since color original pictures have various picture qualities, and the gradation of halftone pictures of color-plates (C, M and Y) produced in color-separation work is unstable and unsatisfactory. The present invention can provide a printed picture having a satisfactory gradation during the course of multicolor plate-making by rationally setting the black plate in the above manner.

EXAMPLE 1

Hereinafter will be described a method for setting a color-separation curve for the black (B) plate in detail by way of examples.

(1) Color film original

As a color-film original, selected was a picture of a woman shot on a positive color-film in 4"×5" (Ektachrome 64).

Table 4 shows density values of the H and S areas of the color-film original measured through respective color filters of red (R), green (G) and blue (B).

TABLE 4

Density Values of H and S Areas of a Color-Film Original

| Filter color of densitometer | H area | S area |
|---|---|---|
| R (red) | 0.29 | 2.87 |
| G (green) | 0.26 | 2.97 |
| B (blue) | 0.28 | 2.96 |

(2) Conditions for color-separation work (each color-plate)

Color-separation work was carried out under conditions so as to maintain a gray balance among the color plates according to a common practice. More concretely, dot area % values of 5%, 50% and 95% were set to H, middle and S area of the C plate, respectively and the same of 3%, 40% and 90% were set to H, middle and S areas of M and Y plates, respectively. Upon setting a color-separation curve for the C plate, $\gamma_c$ =0.45 was adopted as $\gamma_c$ value in the tonal conversion formula (1). On the other hand, as the $\gamma$ value for the M and Y plates, $\gamma_M=\gamma_Y=0.1850$ was adopted to satisfy the above gray balance conditions.

Table 3 shows conditions for setting a color-separation curve for the C plate. These conditions were obtained by formulating Kodak Ektachrome 64 Professional (daylight) shown in FIG. 1 in a manner as shown in Table 1, determining D$_n$ values, light intensity values (X$_n$), basic light intensity values (X$_n$−X$_{Hn}$) and regularized light intensity values ($x_n$), and determining dot area % values (a$_{cxn}$) for the C plate by conducting the tonal conversion formula (1).

(3) Plate-making design of the black (B) plate

Figure 3:
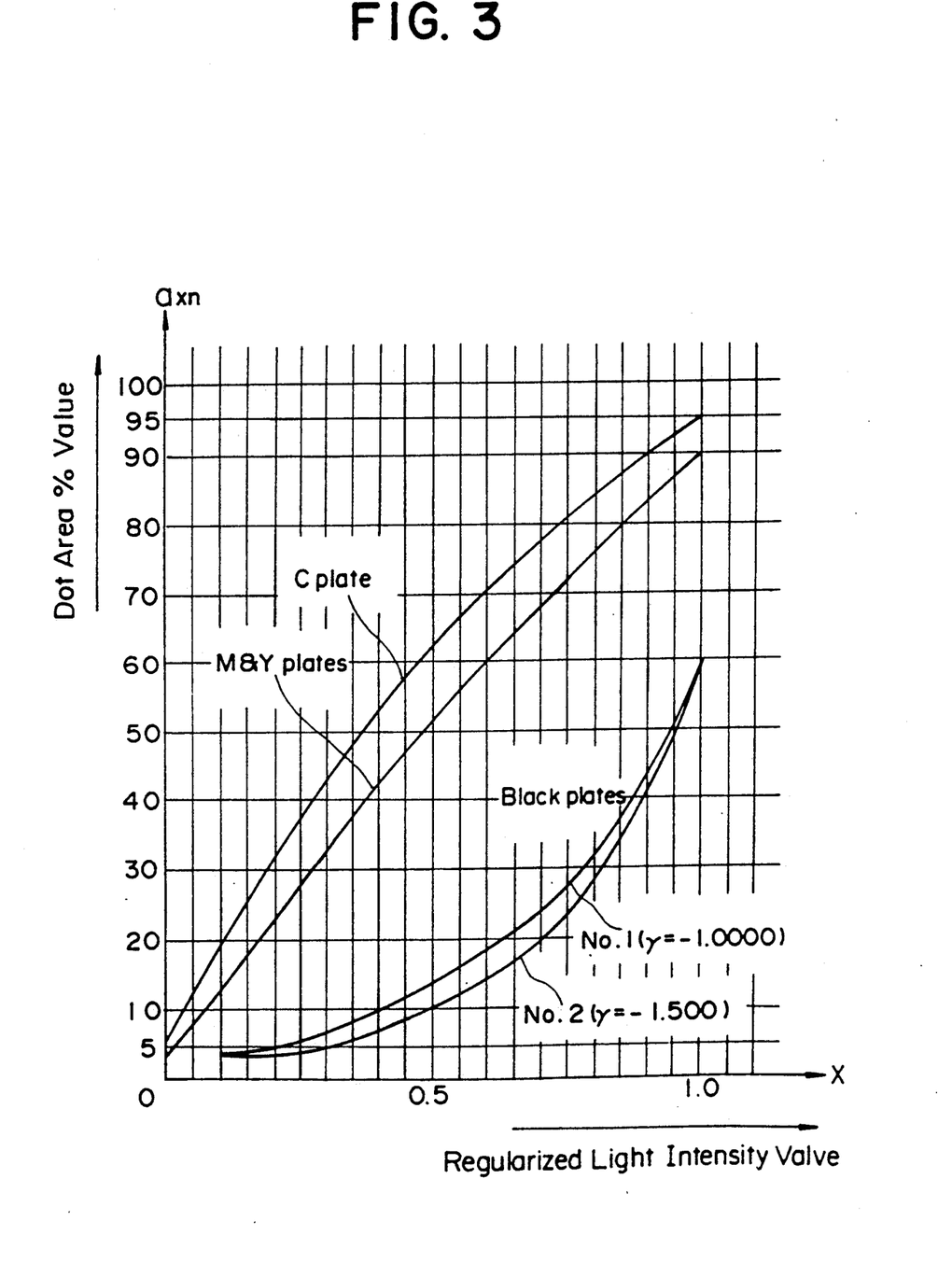
FIG. 3 shows a relationship of X axis color-separation curves between color (C, M and Y) plates and black (B) plates, adopted in Example.

A range where the black plate is used in determined on the basis of dot area % value of the basic C plate determined in the above manner, besides dot area % values set to the black starting point and black finishing point, respectively and $\gamma_B$ value in the tonal conversion formula (1) for obtaining a color-separation curve for the black (B) plate are set. In this example, these conditions were set as shown in Table 5. Table 6 shows data for setting a color-separation curve for the black (B) plate which was obtained under these conditions. FIG. 3 shows color-separation curves for the black (B) plate obtained on the bases of the data in Table 6 together with another color-separation curves (C, M and Y).

TABLE 5

Design Data of Color-Separation Curve for B Plate

| | Black plate | |
|---|---|---|
| Using range of B plate based on dot area % values of C plate | Dot area % values of black starting & finishing point | $\gamma_B$ value |
| 20% | 3.0000 | from −1.0000 |
| 95% | 60.0000 | to −1.5000 |

TABLE 6

Setting Data of Color-Separation Curve for B Plate

| | | | (Dot area % values for B plate) Curve No. | |
|---|---|---|---|---|
| | | | 1 | 2 |
| a$CX_n$ | $C_{Xn}$ | $B_{Xn}$ | $\gamma_B$ −1.0000 | $\gamma_B$ −1.5000 |
| 20.0000 | 0.1098 | 0.0000 | 3.0000 | 3.0000 |
| 30.0000 | 0.1906 | 0.0908 | 4.4727 | 3.6856 |
| 40.0000 | 0.2788 | 0.1898 | 6.4713 | 4.7240 |
| 50.0000 | 0.3759 | 0.2989 | 9.2714 | 6.3548 |
| 60.0000 | 0.4839 | 0.4202 | 13.3327 | 9.0943 |
| 70.0000 | 0.5054 | 0.5567 | 19.4875 | 13.9702 |
| 80.0000 | 0.7445 | 0.7130 | 29.3730 | 22.9825 |
| 90.0000 | 0.9072 | 0.8958 | 46.4900 | 42.2091 |
| 95.0000 | 1.0000 | 1.0000 | 60.0000 | 60.0000 |

(4) Plate-making

Magnascan 646 manufactured by Crosfield Electronics Limited was used as a scanner and Chromarine Proofing Process by DuPont was adopted as color proofing.

The resulting color printed picture produced in the above manner was satisfactory, of which delicate tone in the bright area was well reproduced because the black starting point of the black plate was set to the bright area (dot area 20% of the C plate), middle area was maintained its light and delicate tone although black was entered there, and shadow area was firmly expressed in tone.

EXAMPLE 2

In this example, a black (B) plate and another color plates (C, M and Y) used in color-printing were produced in Wet Printing Method by means of a sheet-fed four-color press under UCR.

(a) Color-film original

As a color-film original, used was a picture of a water mill in a countryside photographed on Ektachrome 64 in 4″×5″ manufactured by Eastman Kodak, as same as in the above Example 1, having a standard picture quality. This color-film original picture relatively has a lot of shadow area when seen as a whole, because of the time and the direction of its shot.

Table 7 shows density values of H and S areas of the color-film original measured through color-filters of R, G and B.

TABLE 7

Density Values of H and S Areas of Color-Film Original

| Filter color of densitometer | H area | S area |
|---|---|---|
| R (red) | 0.36 | 2.83 |
| G (green) | 0.39 | 2.84 |
| B (blue) | 0.38 | 2.84 |

(2) Plate-making design of the black (B) and the color (C, M and Y) plates (C, M and Y) after UCR Plate-making design of the black (B) plate was carried out taking into consideration the following conditions, although its procedure was basically the same as Example 1.

An amount of the black (B) plate to be entered was a slightly smaller than that adopted in the conventional manner in the field, since the color-film original picture had a lot of shadows on its entire surface.

A total amount of dot area % value of the C, M, Y and B plates in the S area was set to 280%, considering a value of 270% adopted in the conventional manner as a guide, since the color-printing was carried out in a wet printing method. Actually, halftone dots of 70%, 60% and 90% were decided to be entered to the S area of the C plate, the S area of the M and Y plates and S area of B plate, respectively (280% in total).

Figure 4:
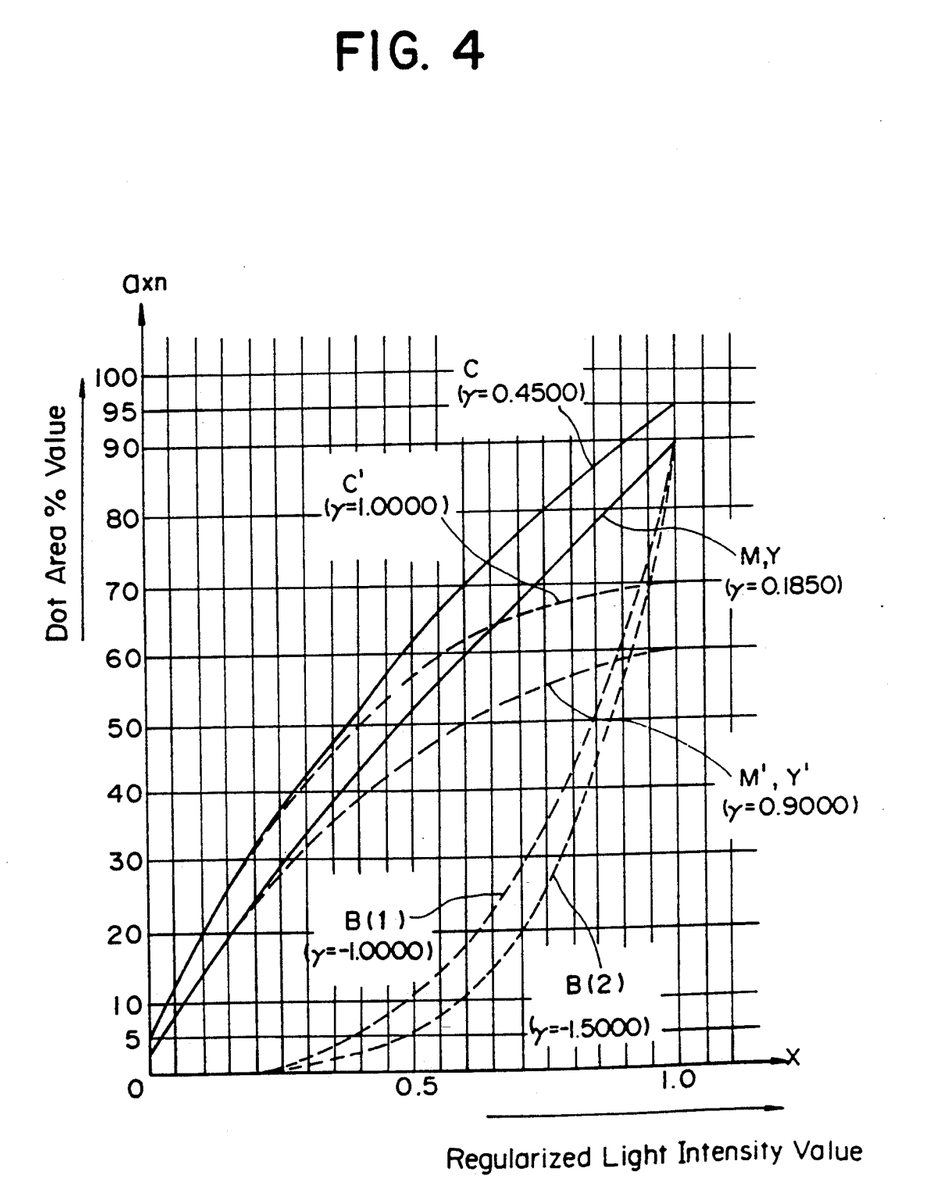
FIG. 4 shows X axis color-separation curves of plates under UCR.

A range to be entered the black (B) plate, namely a black starting point (STP) and a black finishing point (EDP), was decided to be from 0.25 to 1.00 on the basis of regularized light intensity values. Accordingly, X axis color-separation curves should be appropriately altered, plate and said dot area % values in the S area, as shown in FIG. 4. In the present invention, shapes of X axis color-separation curves may be altered by changing $\gamma$ value in the tonal conversion formula (1).

Conditions of the above plate-making design are shown in Table 8. Table 9 shows data for setting X axis color-separation curves for the black (B) plate and the other color plates (C′, M′ and Y′) under the conditions shown in Table 8, when conducting under color removal (UCR). FIG. 4 shows X axis color-separation curves of the black (B) and the other color plates (C′, M′ and Y′) based on the data in Table 9. FIG. 4 also shows another X axis color-separation curves for color plates (C, M and Y), when not conducting UCR, like FIG. 3.

TABLE 8

Data for Plate-Making Design for Plates under UCR

| | | Color plates before UCR | | Color & black plates under UCR | | | |
|---|---|---|---|---|---|---|---|
| | | C | M, Y | C′ | M′, Y′ | B (1) | B (2) |
| Regularized light intensity value region | STP ($H_{Hn}$) | 0.000 | 0.000 | 0.000 | 0.000 | 0.250 | 0.250 |
| | EDP ($X_{Sn}$) | 1.000 | 1.000 | 1.000 | 1.000 | 1.000 | 1.000 |
| Using range of halftone dot area a % value | STP ($a_H$) | 5.000 | 3.000 | 5.000 | 3.000 | 0.000 | 0.000 |
| | EDP ($a_S$) | 95.00 | 90.00 | 70.00 | *59.90 | 90.00 | 90.00 |

TABLE 8-continued

| Data for Plate-Making Design for Plates under UCR | | | | | | |
|---|---|---|---|---|---|---|
| | Color plates before UCR | | Color & black plates under UCR | | | |
| | C | M, Y | C' | M', Y' | B (1) | B (2) |
| γ value | 0.450 | 0.185 | 1.000 | 0.900 | −1.00 | −1.50 |

*This value is a dot area % value for M and Y plates in the case of setting 70% dot area % value to C plate in order to meet a demand that gray balance should be maintained upon superimposing the M and Y plates in printing. This values was obtained from a correlation table of dot area % value relating to maintenance of a gray balance among C, M and Y plates, made by the present inventors.

TABLE 9

Data for Setting Color-Separation Curves for Plates under UCR (dot area %)

| Regularized light intensity values of color original | Color plates before UCR | | | | Color and black plates under UCR | | |
|---|---|---|---|---|---|---|---|
| | C | M, Y | C' | M', Y' | Regularized light intensity values for B plate | B (1) | B (2) |
| 0.000 | 5.00 | 3.00 | 5.00 | 3.00 | — | — | — |
| 0.150 | 25.08 | 18.52 | 26.09 | 20.39 | — | — | — |
| 0.250 | 36.83 | 28.34 | 36.61 | 29.32 | 0.000 | 0.000 | 0.000 |
| 0.350 | 47.43 | 37.74 | 44.96 | 36.58 | 0.133 | 3.593 | 1.719 |
| 0.500 | 61.40 | 51.11 | 54.38 | 45.00 | 0.333 | 11.543 | 6.354 |
| 0.650 | 73.36 | 63.66 | 61.05 | 51.17 | 0.533 | 24.143 | 15.603 |
| 0.750 | 80.36 | 71.59 | 64.38 | 54.34 | 0.667 | 36.420 | 26.454 |
| 0.850 | 86.68 | 79.18 | 67.02 | 56.92 | 0.800 | 53.096 | 43.641 |
| 1.000 | 95.00 | 90.00 | 70.00 | 59.90 | 1.000 | 90.000 | 90.000 |

(3) Plate-making

The same scanner and color-proofing process were adopted as in Example 1.

The resulting color printed picture produced according to the above plate-making design had a tone as planned in the design stage, of which plates were satisfactory for wet printing method. The shadows ranging from the particularly bright area to the middle area could be lessened and the tone of the picture gave a favorable and bright impression, as expected.

EXAMPLE 3

Hereinafter will be described a technique for setting a black (B) plate when conducting "gray component replacement" (GCR) (long range UCR, full black), which technique has been said to have practical difficulties although having been introduced in books or writings relating to the printing techniques. An emphasis of the following description will be put on how the black plate, which is a chief plate under GCR, is rationally set according to the present invention.

(i) Plate-making design of a black (B) plate

A black plate under GCR is set under conditions that a sum of dot area % values of the black (B) plate set under GCR and dot area % values of color-plates (C', M' and Y') subjected to under color removal based on the black plate (B) is equal to a sum of dot area % values of standard color-plates (C, M and Y) not subjected to under color removal (UCR) (hereinafter will be expressed as "before GCR").

Table 10 shows conditions for setting color-separation curves for the standard color plates (C, M and Y) before GCR. According to the present invention, it is possible to produce a color printed picture of which gradation ranging from H to S area is quite natural to human vision, as far as its color-separation curves are set under these conditions and by conducting the tonal conversion formula (1). This advantage can also be obtained under conditions that the tonal conversion formula (1) is used upon setting color-separation curves under UCR in Example 2, or even upon setting color-separation curves under GCR in this Example.

TABLE 10

| Data for Setting Color-Separation Curves for Color Plates before GCR | | | | |
|---|---|---|---|---|
| | dot in H area | dot in middle area | dot in S area | γ value |
| C | 5.00 | 50.00 | 95.00 | 0.450 |
| M, Y | 3.00 | 40.00 | 90.00 | 0.185 |

Next, a regularized light intensity value range to be entered the black (B) under GCR was set to 0.050–1.000, longer than UCR in Example 2 (range of 0.250–1.000) and dot area % values to be set to a black starting point (STP) and a black finishing point (EDP) were set to 0.00% and 100.00%, respectively.

Further, conditions for setting color-separation curves for color plates (C', M' and Y') under GCR were determined as follows.

The conditions were determined, taking into consideration a conventional setting value of 270%, which is a sum of dot area % value of the four color in S area and is practically reasonable value because of poor trapping of inks and the like when conducting color-printing in wet printing method, and a gray balance, besides referring to the γ value which was used upon setting the color-separation curves for the color plates (C', M' and Y') under UCR shown in Example 2. These conditions are shown in Table 11. Meanwhile, a sum of dot area % values in the S area, C'+M'+Y'+B (the above)=275, according to Table 11 coincides with the sum, C+M+Y=275, before GCR in Table 9.

TABLE 11

| Data for Setting Color-Separation Curves for Color Plates under GCR | | | |
|---|---|---|---|
| | dot in H area | dot in middle area | dot in S area | γ value |
| C' | 5.00 | 50.00 | 65.00 | 1.000 |
| M', Y' | 3.00 | 40.00 | 55.00 | 0.832 |

Next, data for setting a color-separation curve for the black (B) plate were made on the basis of a difference referred as ΔDOT, hereinafter) between a sum of dot area % values of the three color plates of C, M and Y before GCR and a sum of dot area % values of the three color plates of C', M' and Y' after GCR.

At that time, the light intensity value range was divided into three, 0.05–0.35, 0.35–0.65 and 0.65–1.00, for the sake of convenience in setting the color-separation curve for the black (B) plate, and appropriate γ values were selected for the respective sections, thereby being obtained the color-separation curve for the black (B) plate consisting of these sections. Table 12 shows values of $a_{BH}$, and $a_{BS}$ (determined on the basis of ΔDOT) set to the brightest and darkest area of the respective sections and γ values used to the respective sections.

TABLE 12

| Data for Setting A Color-Separation Curve for B Plate under GCR | | | |
|---|---|---|---|
| Regularized light intensity value range of color-original | $a_{BH}$ | $a_{BS}$ | γ value |
| 0.05–0.35 | 0.00 | 15.44 | −0.825 |
| 0.35–0.65 | 15.44 | 51.09 | −0.135 |
| 0.65–1.00 | 51.09 | 100.0 | 0.0001 |

Figure 5:
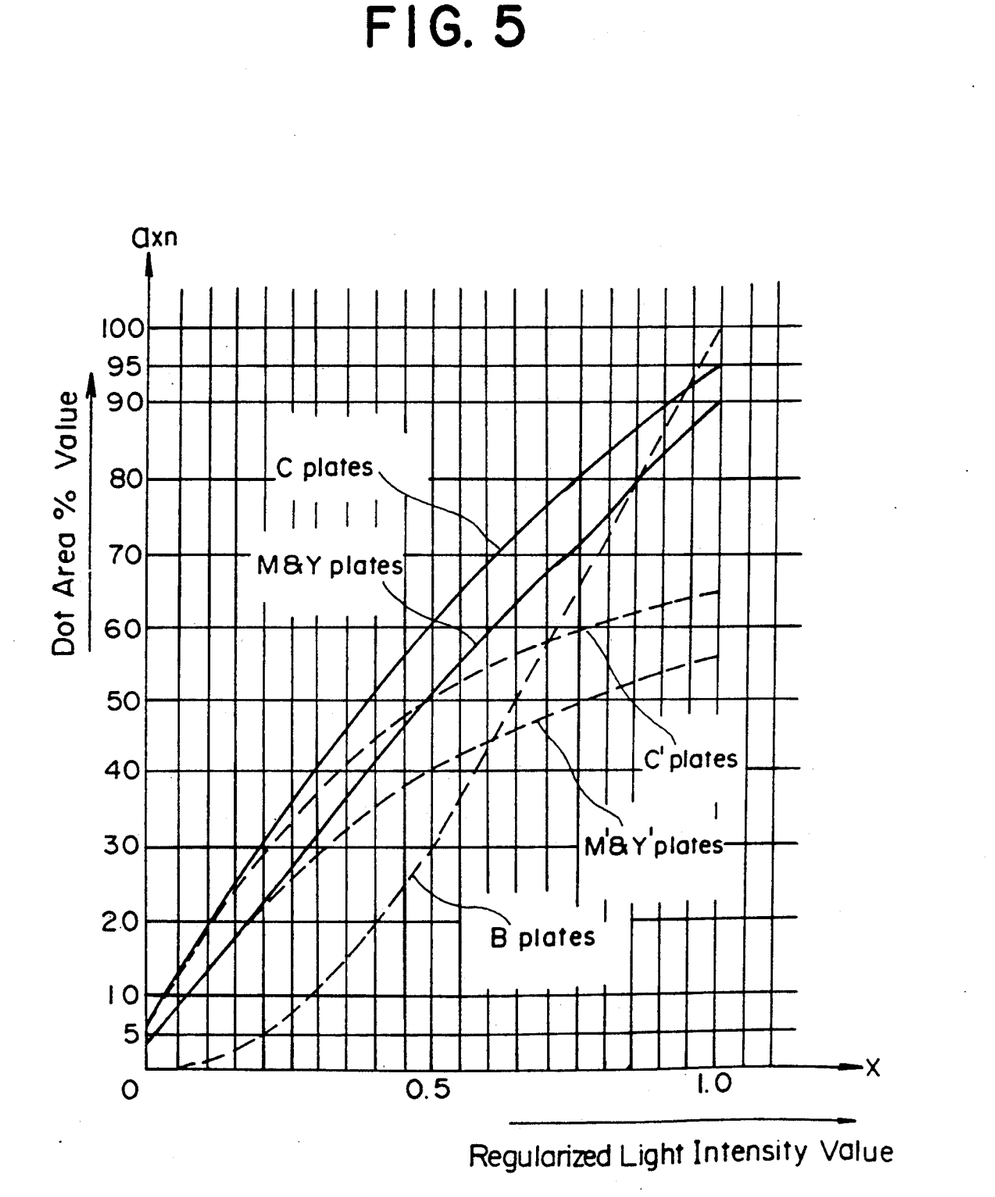
FIG. 5 shows X axis color-separation curves of plates under GCR.

Table 13 shows data for setting color-separation curves for the plates under GCR of the above-described. Table 14 shows data for setting X axis color-separation curves for the black (B) and the other color plates (C', M' and Y') under GCR under these conditions and FIG. 5 depicts X axis color-separation curves of the plates (C', M', Y' and B) obtained on the basis of the data shown in Table 14. Incidentally, when obtaining data for X axis color-separation curves for the black (B) plates, (1), (2) and (3), according to the data in Table 13, it is efficient in computation to regularize each of the three light intensity ranges (0.05–0.35, 0.35–0.65, 0.65–1.00) to 1.0 and conduct the tonal conversion formula (1). In FIG. 5, there is no indication of the sections of B(1), B(2) and B(3). FIG. 5 also shows X axis color-separation curves of the color plates (C, M and Y) before GCR, like FIGS. 3 and 4.

TABLE 13

| | Data for Plate-Making Design for Plates under GCR | | | | | | | |
|---|---|---|---|---|---|---|---|---|
| | | Color plates before GCR | | Color & black plates under GCR | | | | |
| | | C | M, Y | C' | M', Y' | B (1) | B (2) | B (3) |
| Regularized light intensity value region | STP (XHn) | 0.00 | 0.00 | 0.00 | 0.00 | 0.05 | 0.35 | 0.65 |
| | EDP (XSn) | 1.00 | 1.00 | 1.00 | 1.00 | 0.35 | 0.65 | 1.00 |
| Using range of halftone dot area % value | STP ($a_H$) | 5.00 | 3.00 | 5.00 | 3.00 | 0.00 | 15.44 | 51.09 |
| | EDP ($a_S$) | 95.00 | 90.00 | 65.00 | 55.00 | 15.44 | 51.09 | 100.00 |
| γ value | | 0.45 | 0.185 | 1.00 | 0.832 | −0.825 | −0.135 | 0.0001 |

TABLE 14

| Data for Setting Color-Separation Curves for Plates under GCR | | | | | | | |
|---|---|---|---|---|---|---|---|
| | | | | | | | (Dot area %) |
| Regularized light intensity value of color-original | Regularized light intensity value for B plate | Color-plates before GCR | | Color-plates under GCR | | Δ DOT | Black plate under GCR |
| | | C | M, Y | C' | M', Y' | | |
| 0.000 | — | 5.00 | 3.00 | 5.00 | 3.00 | — | — |
| 0.050 | 0.000 | 12.04 | 8.285 | 12.25 | 8.57 | −0.776 | 0.000 |
| 0.150 | 0.105 | 25.08 | 18.52 | 24.47 | 18.23 | 1.198 | 2.399 |
| 0.250 | 0.211 | 36.83 | 28.34 | 34.18 | 26.20 | 6.917 | 6.922 |
| 0.350 | 0.316 | 47.43 | 37.74 | 41.89 | 32.79 | 15.437 | 15.437 |
| 0.500 | 0.474 | 61.40 | 51.11 | 50.58 | 40.58 | 31.881 | 31.880 |
| 0.650 | 0.632 | 73.36 | 63.66 | 56.74 | 46.42 | 51.089 | 51.089 |
| 0.750 | 0.737 | 80.36 | 71.59 | 59.81 | 49.48 | 64.758 | 65.079 |
| 0.850 | 0.842 | 86.68 | 79.18 | 62.25 | 52.01 | 78.776 | 79.070 |
| 1.000 | 1.000 | 95.00 | 90.00 | 65.00 | 55.00 | 100.000 | 100.000 |

If comparing the values of ΔDOT in the whole region (STP-EDP) entered black (B) with the data for setting a color-separation curve for the black (B) plate under GCR, it will be recognized that they are in good agreement. A black (B) plate so set is practically usable without introducing any problem. The present invention provides a method of rationally setting color-separation curves for color plates and, particularly a black (B) plate under GCR which has been said to be very difficult and for which there has not been any theory or methodical theory.

What is claimed is:

1. A method for producing color and black plates in a multi-color plate making apparatus by setting a color-separation curve, the method comprising the steps of:
   (i) determining a light intensity value $X_n$ and a basic light intensity xn from a density information value $D_n$ of an arbitrary pixel of a color-film original picture by using photographic density characteristic curves of a photographic film used to form the color-film original picture, and converting the basic light intensity value (xn) into a dot area % value $a_{xn}$ by conducting a tonal conversion according to a formula 1, thereby setting a color-separation curve of a predetermined basic color plate, any one among C, M or Y, other than a black (B) plate, the color-separation curve of the basic color plate being represented by a correlation between the basic light intensity values and the dot area % values;

(ii) determining a light intensity value range $X_{BXH}$–$X_{BXS}$ to set for the black plate and dot area % values $a_{BH}$–$a_{BS}$ to be set for the color-separation curve of the basic color plate;

(iii) determining a light intensity value $B_{xn}$ of the arbitrary pixel in the light intensity value range $X_{BSH}$–$X_{BXS}$ $X_{BXH}$–$X_{BXS}$ into a dot area % value $a_{Bxn}$ for the black plate, thereby setting a color-separation curve of the black plate under initial conditions determined in step (ii) by conducting a tonal conversion according to formula (1);

(iv) producing the color plate in accordance with the color-separation curve of the basic color plate set in step (i); and, (v) producing the black plate in accordance with the color-separation curve of the black plate set in step (iii);

wherein the formula, 1 is presented as follows:

$$a_{xn} = a_H + \alpha(1-10^{-k \cdot xn})(a_S - a_H)/(\alpha - \beta) \quad (1)$$

where $xn$: a basic light intensity value represented by $xn = X_n - X_{Hn}$, determined by subtracting a light intensity value $X_{Hn}$ of a brightest area obtained from a corresponding density information value $D_{Hn}$ of the brightest area of the original color-film picture from a light intensity value $X_n$ of a pixel obtained from a density information value, $D_n$, of a corresponding pixel of the color-film original picture for a basic color plate, where a brightest area of the black plate should be read as a part-where black is entered (a black starting point);

$a_{xn}$: a dot area % value set to a pixel on color, C, M and Y, and black B, plates corresponding to an arbitrary pixel of an original picture;

$a_H$: a dot area % value predeterminedly set to a black starting point of a black plate or a brightest area of respective color plates;

$a_S$: a dot area % value predeterminedly set to a part of a black plate where entering of black is finished or a darkest area of respective color plates;

$\alpha$: a surface reflectance of a paper used to produce a printed picture thereon;

$\beta$: a value determined by $\beta = 10^{-\beta}$;

$k$: a value determined by $k = \gamma/(X_{Sn} - X_{Hn})$, where $X_{Sn}$ is a light intensity value of a darkest area obtained from a density information value $D_{Sn}$ of the darkest area, S area, of an original picture in a case of a basic color plate, and where $X_{Sn}$ represents a light intensity value of black finishing point in a case of a black plate;

$\gamma$: an arbitrary coefficient; and xn, n Hn, Sn, H and S should be accompanied with C, M Y, and B in relation to color C, M, and Y, and black B, plates upon conducting tonal conversion formula (1).

2. The method according to claim 1, where the photographic density characteristic curves are expressed in a orthogonal coordinate system in which a vertical axis represents density values and a horizontal axis represents exposure values.

3. The method according to claim 2, where a scale of the horizontal axis is coincided with a density value scale of the vetical axis, and light intensity values of the horizontal axis are determined from the density values.

4. The method according to claim 1, where the basic color-separation curve is of the C plate.

5. The method according to claim 1, where the range of the light intensity values $X_{Hn} - X_{Sn}$ obtained from the density information values of any other color plate than the black B, plate is regularized to 1.0 (0–1.0).

* * * * *

UNITED STATES PATENT AND TRADEMARK OFFICE
CERTIFICATE OF CORRECTION

PATENT NO. : 5,134,494

DATED : 07/28/92

INVENTOR(S) : Takashi NUMAKURA et al.

It is certified that error appears in the above-identified patent and that said Letters Patent is hereby corrected as shown below:

Column 23, line 2, change "a formula 1" to --a formula (1)--.

Column 23, line 16, delete "$X_{BSH}-X_{BXS}$."

Column 23, line 28, change "the formula, 1" to --the formula (1)--.

Signed and Sealed this

Fifth Day of October, 1993

BRUCE LEHMAN

*Attest:*

*Attesting Officer*     Commissioner of Patents and Trademarks